United States Patent [19]
Yanacek et al.

[11] Patent Number: 5,940,376
[45] Date of Patent: Aug. 17, 1999

[54] METHOD AND APPARATUS TO ESTABLISH A TAP-POINT IN A SWITCHED NETWORK USING SELF-CONFIGURING SWITCHES HAVING DISTRIBUTED CONFIGURATION CAPABILITIES

[75] Inventors: Judith A. Yanacek, Derry; Bruce G. Clements, Weare; Theodore C. Len, Amherst, all of N.H.

[73] Assignee: Cabletron Systems, Inc., Rochester, N.H.

[21] Appl. No.: 08/790,473

[22] Filed: Jan. 29, 1997

[51] Int. Cl.[6] ........................................................ H04Q 1/24
[52] U.S. Cl. .............................. 370/250; 370/254; 379/34
[58] Field of Search .................................... 370/250, 254, 370/245, 244, 255, 251, 248, 242; 379/34, 35, 133

[56] References Cited

U.S. PATENT DOCUMENTS

| | | | |
|---|---|---|---|
| 4,939,509 | 7/1990 | Bartholomew et al. | 370/62 |
| 5,115,495 | 5/1992 | Tsuchiya et al. | 370/94.1 |
| 5,195,087 | 3/1993 | Bennett et al. | 370/62 |
| 5,299,257 | 3/1994 | Fuller et al. | 379/100 |
| 5,305,312 | 4/1994 | Fornek et al. | 370/62 |
| 5,315,580 | 5/1994 | Phaal | 370/17 |
| 5,357,508 | 10/1994 | Le Boudec et al. | 370/60.1 |
| 5,457,729 | 10/1995 | Hamann et al. | 379/34 |
| 5,485,455 | 1/1996 | Dobbins et al. | 370/60 |
| 5,509,123 | 4/1996 | Dobbins et al. | 395/200.15 |
| 5,590,171 | 12/1996 | Howe et al. | 379/33 |
| 5,627,819 | 5/1997 | Dev et al. | 370/250 |
| 5,675,578 | 10/1997 | Grubner et al. | 370/248 |
| 5,715,293 | 2/1998 | Mahoney | 379/23 |
| 5,754,532 | 5/1998 | Dev et al. | 370/250 |

FOREIGN PATENT DOCUMENTS

| | | |
|---|---|---|
| 0453128 A2 | 10/1991 | European Pat. Off. ........ H04L 12/56 |
| 0462691 | 12/1991 | European Pat. Off. ........ H04L 12/26 |
| 0462691 A2 | 12/1991 | European Pat. Off. . |
| WO 95/25314 | 9/1995 | WIPO . |
| WO 95/34158 | 12/1995 | WIPO ............................ H04M 3/22 |
| WO 96/21982 | 7/1996 | WIPO . |

OTHER PUBLICATIONS

JP,A,61 263350, Nov. 21, 1986, Patent Abstracts of Japan vol. 011, No. 117 (E–498) Apr. 11, 1987 (Hitachi Ltd).

*Primary Examiner*—Chau Nguyen
*Assistant Examiner*—Kenneth Vanderpuye
*Attorney, Agent, or Firm*—Wolf, Greenfield & Sacks, P.C.

[57] ABSTRACT

A method and apparatus for monitoring data sent between a source node and destination node in a switched network, wherein the switches configure themselves to establish a connection path to a probe switch to receive the monitored data. The source and destination are identified along with the probe switch. An originating switch on a path between the source and destination is identified and connections between the originating switch and the probe switch are established. The originating switch sends out a first message and when the probe switch receives the first message, it returns a second message to the originating switch. Each switch between the originating switch and the probe switch that receives the first and second messages configures itself to establish the connection path.

25 Claims, 21 Drawing Sheets

| CONNECTION TABLE SW300 | | | | |
|---|---|---|---|---|
| SA | DA | INPORT | OUTPORT | OUTPORTS |
| S | D | 302 | 304 | |
| D | S | 304 | 302 | |
| S | D | 302 | -1 | 304,306 |
| D | S | 304 | -1 | 302,306 |
| S | D | 302 | -1 | 304,306 |
| D | S | 304 | 302 | |
| S | D | 302 | 304 | |
| D | S | 304 | -1 | 302,306 |

FIG. 4A

| TAP TABLE SW300 | | | | | |
|---|---|---|---|---|---|
| DA/SA | RQ PORT | RSP PORT | TYPE | STATUS | DIRECTION |
| S/D | INVALID | 306 | ORIG | ~ | ~ |
| | | | | | |

FIG. 4B

| CONNECTION TABLE SW500 | | | | |
|---|---|---|---|---|
| SA | DA | INPORT | OUTPORT | OUTPORTS |
| S1 | D1 | 506 | 508 | |
| D1 | S1 | 508 | 506 | |
| S1 | D1 | 506 | -1 | 508,510 |
| D1 | S1 | 508 | -1 | 506,510 |
| | | | | |

*FIG. 6A*

| TAP TABLE SW500 | | | | | |
|---|---|---|---|---|---|
| DA/SA | RQ PORT | RSP PORT | TYPE | STATUS | DIRECTION |
| S1/D1 | INVALID | 510 | ORIG | PROBE FOUND | BI |
| | | | | | |

*FIG. 6B*

| TAP TABLE SW502 ||||||
|---|---|---|---|---|---|
| DA/SA | RQ PORT | RSP PORT | TYPE | STATUS | DIRECTION |
| S1/D1 | 512 | 516 | INTER | ~ | BI |
| | | | | | |

*FIG. 6C*

| TAP TABLE SW504 ||||||
|---|---|---|---|---|---|
| DA/SA | RQ PORT | RSP PORT | TYPE | STATUS | DIRECTION |
| S1/D1 | 518 | 520 | TERM | ~ | ~ |
| | | | | | |

*FIG. 6D*

| CONNECTION TABLE SW504 | | | | |
|---|---|---|---|---|
| SA | DA | INPORT | OUTPORT | OUTPORTS |
| S1 | D1 | 518 | 520 | |
| D1 | S1 | 518 | 520 | |
| | | | | |
| | | | | |

*FIG. 6E*

| CONNECTION TABLE SW502 | | | | |
|---|---|---|---|---|
| SA | DA | INPORT | OUTPORT | OUTPORTS |
| S1 | D1 | 512 | 516 | |
| D1 | S1 | 512 | 516 | |
| | | | | |
| | | | | |

*FIG. 6F*

| CONNECTION TABLE    SW500 |||||
|---|---|---|---|---|
| SA | DA | INPORT | OUTPORT | OUTPORTS |
| S1 | D2 | 506 | 510 | |
| D2 | S1 | 510 | 506 | |
| | | | | |
| | | | | |

FIG. 7A

| TAP TABLE    SW500 ||||||
|---|---|---|---|---|---|
| DA/SA | RQ PORT | RSP PORT | TYPE | STATUS | DIRECTION |
| S1/D2 | 510 | ~ | TERM | ~ | BI |
| | | | | | |

FIG. 7B

| CONNECTION TABLE SW502 | | | | |
|---|---|---|---|---|
| SA | DA | INPORT | OUTPORT | OUTPORTS |
| S1 | D2 | 512 | 514 | |
| D2 | S1 | 514 | 512 | |
| S1 | D2 | 512 | -1 | 514,516 |
| D2 | S1 | 514 | -1 | 512,516 |
| | | | | |
| | | | | |

622

628 { rows 1-2 }
630 { rows 3-4 }

FIG. 7C

| TAP TABLE SW502 | | | | | |
|---|---|---|---|---|---|
| DA/SA | RQ PORT | RSP PORT | TYPE | STATUS | DIRECTION |
| S1/D2 | INVALID | 516 | ORIG | PROBE FOUND | ~ |
| | | | | | |
| | | | | | |

| CONNECTION TABLE  SW504 | | | | |
|---|---|---|---|---|
| SA | DA | INPORT | OUTPORT | OUTPORTS |
| S1 | D2 | 518 | 520 | |
| D2 | S1 | 518 | 520 | |
| | | | | |
| | | | | |
| | | | | |

618

638 { (rows 1–2)

FIG. 7E

| TAP TABLE  SW504 | | | | | |
|---|---|---|---|---|---|
| DA/SA | RQ PORT | RSP PORT | TYPE | STATUS | DIRECTION |
| S1/D2 | 518 | 520 | TERM | ~ | ~ |
| | | | | | |
| | | | | | |

614

636 (row 1)

FIG. 7F

| CONNECTION TABLE SW800 ||||| |
|---|---|---|---|---|
| SA | DA | INPORT | OUTPORT | OUTPORTS |
| S2 | D3 | 810 | 812 | |
| D3 | S2 | 812 | 810 | |
| S2 | D3 | 810 | -1 | 812,814 |
| D3 | S2 | 812 | -1 | 810,814 |
|  |  |  |  |  |
|  |  |  |  |  |

900

902 { (rows 1-2)
903 { (rows 3-4)

*FIG. 9A*

| TAP TABLE SW800 ||||||
|---|---|---|---|---|---|
| DA/SA | RQ PORT | RSP PORT | TYPE | STATUS | DIRECTION |
| S2/D3 | INVALID | 814 | ORIG | PROBE FOUND | ~ |
|  |  |  |  |  |  |

CONNECTION TABLE   SW802

| SA | DA | INPORT | OUTPORT | OUTPORTS |
|---|---|---|---|---|
| S2 | D3 | 818 | 820 | |
| D3 | S2 | 818 | 820 | |
| | | | | |
| | | | | |

*FIG. 9C*

TAP TABLE   SW802

| DA/SA | RQ PORT | RSP PORT | TYPE | STATUS | DIRECTION |
|---|---|---|---|---|---|
| S2/D3 | 818 | 820 | INTER | PROBE FOUND | |
| | | | | | |

*FIG. 9D*

| CONNECTION TABLE SW804 ||||| 924 |
|---|---|---|---|---|
| SA | DA | INPORT | OUTPORT | OUTPORTS |
| S2 | D3 | 822 | 824 | |
| D3 | S2 | 822 | 824 | |
| | | | | |
| | | | | |

926 braces the two data rows.

*FIG. 9E*

| TAP TABLE SW804 |||||| 920 |
|---|---|---|---|---|---|
| DA/SA | RQ PORT | RSP PORT | TYPE | STATUS | DIRECTION |
| S2/D3 | 822 | 824 | TERM | PROBE FOUND | ~ |
| | | | | | |

922 indicates the data row.

*FIG. 9F*

| TAP TABLE SW806 | | | | | | 908 |
|---|---|---|---|---|---|---|
| DA/SA | RQ PORT | RSP PORT | TYPE | STATUS | DIRECTION | |
| S2/D3 | 826 | 828 | INTER | PROBE NOT FOUND | | |
| | | | | | | |

910 points to the S2/D3 row.

*FIG. 9G*

| TAP TABLE SW808 | | | | | | 912 |
|---|---|---|---|---|---|---|
| DA/SA | RQ PORT | RSP PORT | TYPE | STATUS | DIRECTION | |
| S2/D3 | 830 | ~ | TERM | PROBE NOT FOUND | | |
| | | | | | | |

914 points to the S2/D3 row.

*FIG. 9H*

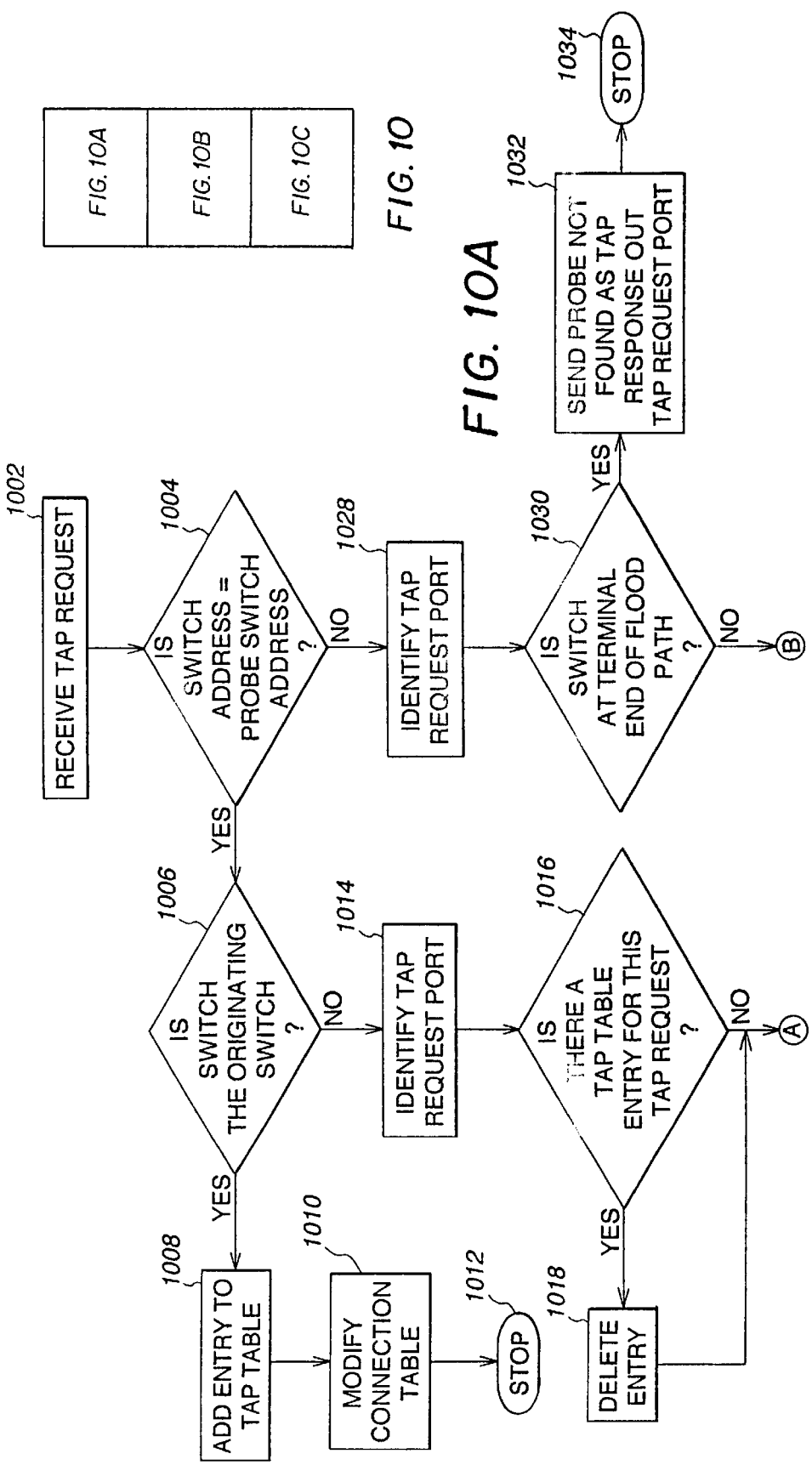

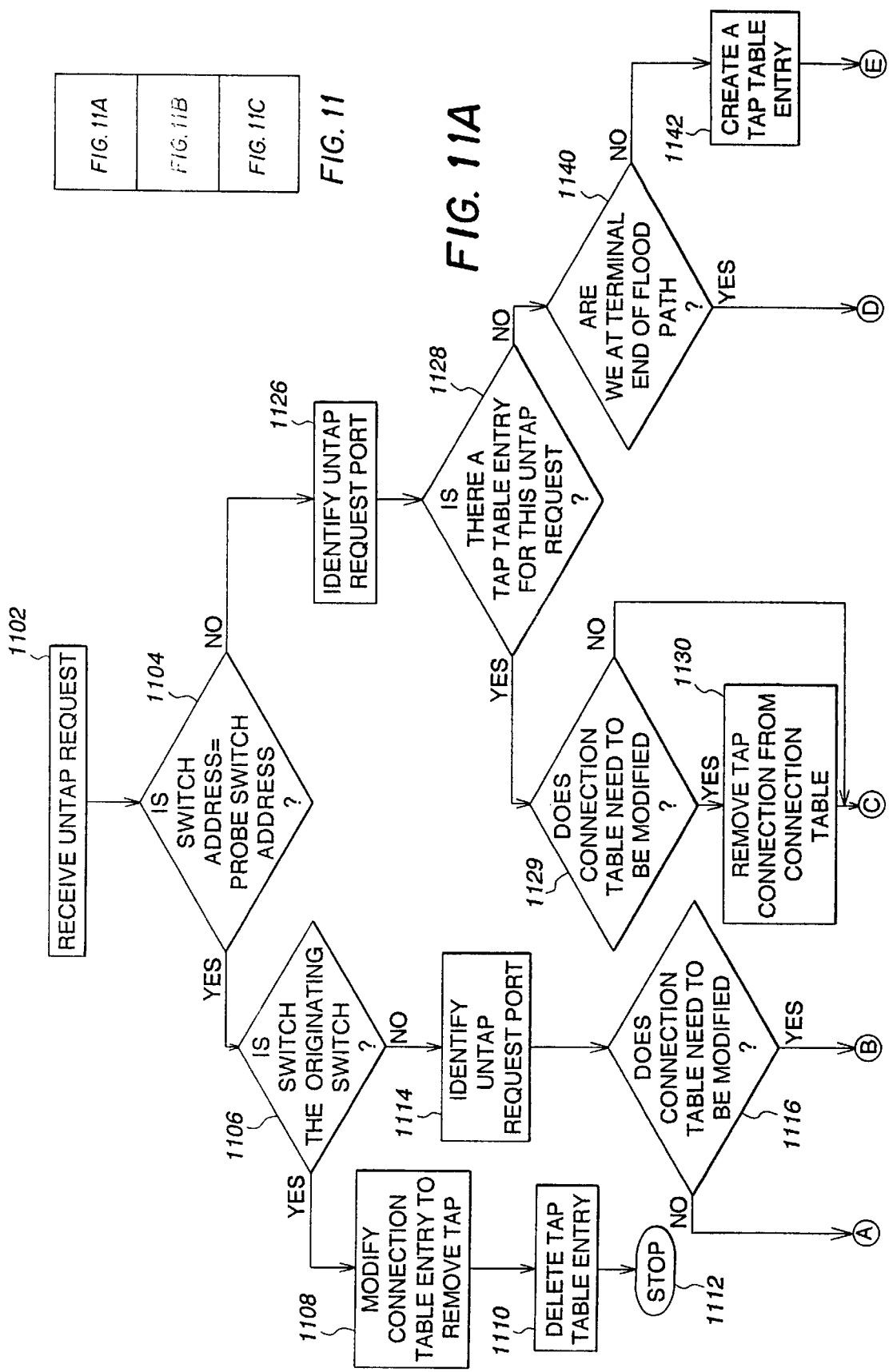

| DEVICE ADDRESS | PORT |
|---|---|
| S | 302 |
| D | 304 |
|  |  |

FIG. 12

METHOD AND APPARATUS TO ESTABLISH A TAP-POINT IN A SWITCHED NETWORK USING SELF-CONFIGURING SWITCHES HAVING DISTRIBUTED CONFIGURATION CAPABILITIES

BACKGROUND OF THE INVENTION

1. Field of the Invention

The present invention is directed to providing surveillance capabilities, or call-tapping, within a switched network environment without using a centralized server to provide the connections in each of the switches necessary to accomplish the tapping function. Each switch in the switched network has within it capability to configure itself so as to provide a call-tapping path.

2. Description of Related Art

In a network where data is transmitted from one node, e.g., a user workstations, to another node, it is sometimes necessary to "tap" into a connection between any two given nodes. This may be for security reasons, a "wire-tap", or for system maintenance, where debugging of a network problem requires monitoring data being sent between the two nodes.

In pending U.S. Ser. No. 08/370,158 U.S. Pat. No. 5,754,532, entitled "Use of Multipoint Connection Services to Establish Call-Tapping Points in a Switched Network," by Dev et al., which is herein incorporated by reference in its entirety, there is described a method to establish a call-tap in a switched network, which, in one embodiment, utilizes point-to-multipoint connections. This method is embodied in the Spectrums® product now available from Cabletron Systems, Inc., Rochester, N.H. In this system, in one embodiment, a tapping node is identified by the user and a centralized connection service, which has a global view of the network topology, identifies those switches in the network which are necessary to accomplish the call-tapping and the centralized server then configures these switches by making appropriate entries in the switches' internal connection tables. The centralized system stores a representation of the topology of the switched network and by the application of various algorithms, determines a path to the tapping point from either (or both) the source or destination.

SUMMARY OF THE INVENTION

According to the present invention, a method and system are provided which allow surveillance of data transmitted or for trouble-shooting in a switched network environment without the need of a centralized server to provide switch connections. Call-tapping logic is located within each switch in the network. Accordingly, when a call-tapping operation is executed, each switch has the capability to determine if it is necessary for the respective switch to configure itself in the call-tapping operation. Further, the present invention provides the ability to monitor the data sent between the source node and the destination node at a particular switch which is on the path between the source and destination nodes. In this way, the functioning of that particular switch can also be analyzed.

The present invention also allows the call-tapping operation to be performed in both a uni-directional and bi-directional mode. In the former mode, data from only one of the source or the destination node is received at the tap point while in the latter mode of operation, data from both the source and destination nodes are received at the tap point.

Further, the present invention provides a network switch having ability to determine that it is in the call-tapping path and also to configure itself so as to provide the connections required for the call-tapping operation.

Still further, when a tap is no longer needed, each switch has the capability to deconfigure itself so as to remove the connections which have been created for the tap.

One embodiment of the present invention is a method of monitoring data transmitted between a source node and a destination node in a switched network. The network includes a plurality of network switches with at least one network switch connected between the source and destination nodes through which the data between the source and destination modes passes. Each network switch includes a connection table. The method includes steps of identifying one network switch connected between the source and destination nodes to be an originating switch, and identifing a network switch to be a probe switch. A network probe is attached to a probe port of the probe switch. All intermediate network switches connected in a path between the originating switch and the probe switch are identified. The originating switch, the probe switch and all intermediate network switches are configured so as to pass data transmitted from at least one of the source node and the destination node to the probe port of the probe switch.

A next embodiment is a method of monitoring data at a probe switch having a probe port and a data probe connected to the probe port. The probe switch is part of a switched network which includes a plurality of switches and having a source node and a destination node sending data to one another through a first switch connected therebetween. The method includes the step of identifying all switches connected between the first switch and the probe switch, and the step of each identified switch, the first switch and the probe switch configuring itself so as to pass data from at least one of the source node and the destination node to the data probe.

Another embodiment is a method of establishing a tap connection between at least one of a source node and a destination node in a switched network. The method includes steps of sending a first message to an originating switch on a path between the source and destination nodes, the originating switch then forwarding the first message so as to be received by all other switches in a flood-path within the switched network. In each respective switch which receives the first message, it is determined if the respective switch is a probe switch and if so, the respective switch sends a second message out a first port on which the first message was received and establishes a connection between the first port and a probe port to which a probe is connected. When the respective switch is not the probe switch, it sends the first message so as to be received by other switches in the flood-path. In each respective switch which receives the first and second messages, a connection is established between the first port and a second port on which the second message was received, and the switch sends the second message out the first port.

These and other features and benefits of the present invention will be understood from the following detailed description of specific embodiments.

BRIEF DESCRIPTION OF FIGURES

FIGS. 4A and 4B are examples of a connection table and tap table found in switch 300 of FIG. 3;

FIGS. 6A–6F are examples of connection tables and tap tables for the switches shown in FIG. 5;

FIGS. 7A–7F are further examples of connection tables and tap tables for the switches shown in FIG. 5;

FIGS. 9A–9H are examples of connection tables and tap tables for the switches shown in FIG. 8;

FIG. 12 is an example of a local directory table for the switch shown in FIG. 3.

DETAILED DESCRIPTION

A switched network connects a plurality of devices such as workstations, printers, storage devices, servers, etc. to one another through a plurality of switches. The switches are configured so as to direct a message, usually in the form of a data packet, from a source to a destination. In a system such as the MMAC-Plus® system available from Cabletron Systems, Inc., Rochester, N.H., the switches may reside in a common chassis or be distributed amongst more than one chassis.

Figure 1:
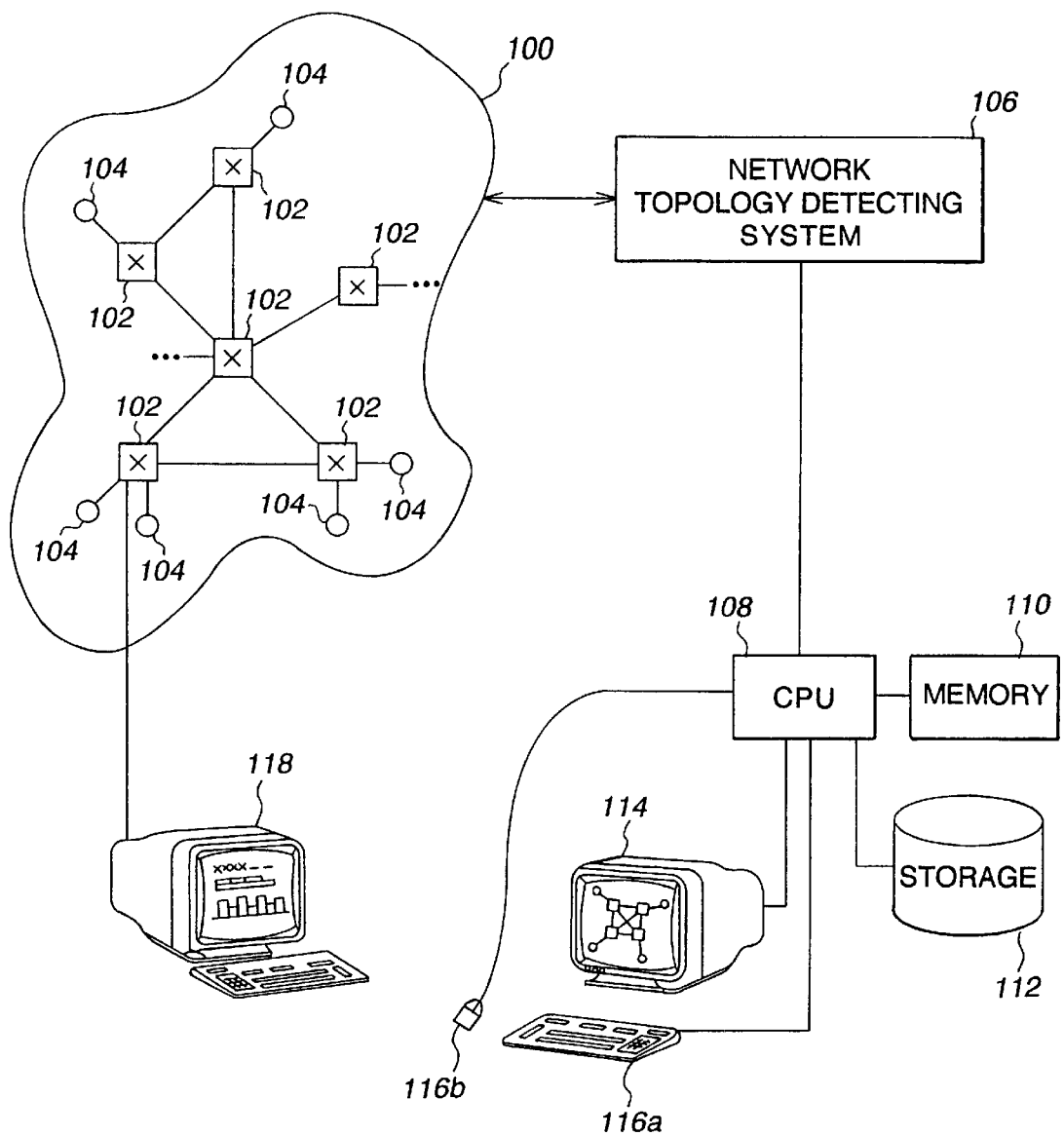
FIG. 1 is a schematic diagram of a network and user access station for illustrating one embodiment of the present invention.

As shown schematically in FIG. 1, a switched network 100 includes a plurality of switches 102 connected to one another, and a plurality of end nodes 104 each connected to a switch 102. Data between any two end nodes 104 is sent through at least one switch 102. A network topology detecting system 106 is coupled to the network 100 so as to determine the topology of the network 100. In a known system such as Spectrum® from Cabletron, the topology detecting system 106 polls the network 100 on a regular basis to determine the status of the switches and other network devices and maintains information about the topology of the network.

A processing unit 108 or CPU is connected to the topology detecting system 106 to receive information regarding the topology of the network 100. A memory 110 and storage device 112 are connected to the processor 108 to provide temporary and permanent storage, respectively, of any information required by the processor 108. In one embodiment, the processor 108 may be running VLAN Manager software available from Cabletron Systems, Inc., which enables "virtual" LANS to be established between different groups of users and applications. A display unit 114 is connected to the processor 108 so as to display, oftentimes in graphic form, a representation of the network, including its topology. Through keyboard and mouse input devices 116a, 116b, connected to the processor 108, and through the interface program of VLAN Manager, a user can perform various analyses of the network and may also control the configuration of the network, e.g., by adding or deleting nodes and/or switches as the network changes.

The VLAN Manager is run on a processor capable of supporting Windows NT 3.51, or Solaris 2.4 and 2.5.1 or HP/UX 10.01 and 10.10 or AIX 4.0 or IRIX 5.3. This could be any one of a number of commercial or proprietary processors. At a minimum, the platform requires 64 megabytes of RAM, 100 megabytes of swap space and at least 150 megabytes of available disk drive space.

If a user wishes to monitor data transmitted between a source and destination node, the user will connect a data analyzer or probe 118 to the network so as to review the "tapped" data. In the present invention, the user can plug the analyzer 118 into any switch in the network to which the user has convenient access. The user will identify the source node and the destination node within the network from which data is going to be collected by the analyzer 118. By reviewing information regarding the network topology, for example, through the graphic display 114 presented by the VLAN Manager, the user can choose or identify a switch along the source/destination path between the source node and the destination node from which the data will be received at the analyzer 118. Accordingly, if a particular switch along this source/destination path is suspected of being defective, the user can choose that switch so that information, e.g., protocol information, can be retrieved along with the data between the nodes and trouble-shooting analysis can be performed.

In order to establish a call tap according to the present invention, a user must first identify the two nodes from which data is to be monitored. Merely for the sake of convention throughout this specification, these two nodes will be referred to as the source node and the destination node. The use of the terms "source" and "destination" has no meaning with regard to a direction of data other than to distinguish one node from the other. The user must then determine an address of each of the source and destination nodes. This information can be retrieved from the processor 108 and is usually the MAC (Media Access Control) address, although it could be the address at another level of the protocol, e.g., the IP address. In the present invention there are two directions in which the data can be monitored: bi-directional or uni-directional. With bi-directional call-tapping, data originating from both the source and destination nodes is received at the analyzer 118. With uni-directional call-tapping, only data originating from one of either the source or destination nodes is received by the analyzer 118. Next, the user must determine the address of the switch to which the probe 118 is connected. Once again, this could be the MAC address of that switch. Finally, as is known, switches have one or more ports on which data is either transmitted or received. Accordingly, the port on the probe switch to which the analyzer 118 is connected must be identified.

In a software program, a call to a routine which implements the call-tapping function may be represented as follows:

execute call-tap (DA, SA, direction, probe address, probe port number)

where DA represents the destination node address, SA represents the source node address, and when the direction chosen is uni-directional, only data originating from the source will be received by the probe. If it is desired to have a uni-directional tap which receives data originating only from the destination node, then the order of the addresses in the call to the subroutine would be switched. In other words, the address of the device in the second position in the subroutine call is the device from which data will be received when in the uni-directional mode. A tap is identified by its DA/SA pair.

In the present invention this command would be directed to a switch, known as the originating switch, which is determined to be in a connection path between the source node and the destination node. The connection path consists of the switches that transfer data between the source and destination. The user identifies the originating switch by, for example, analyzing a topology representation provided by the VLAN Manager. This may be in the form of a graphical display or could be a list of the switches between the source and destination nodes. Such a list could be easily generated by the VLAN Manager which has information regarding the network topology and which has access to connection tables within all switches. Thus, it would be a relatively straight-forward procedure to present to the user a list of the switches between a given source and destination node. It is not necessary, however, that the originating switch be a switch which has a direct connection to either the source or the destination node. Any switch between the source and destination, i.e., a switch along the connection path between the source and destination, can be chosen to be the originating switch. The primary requirement is that the switch have an entry in its connection table for the source/destination pair. In one embodiment, this command is sent to the originating switch as an SNMP request.

Figure 2:
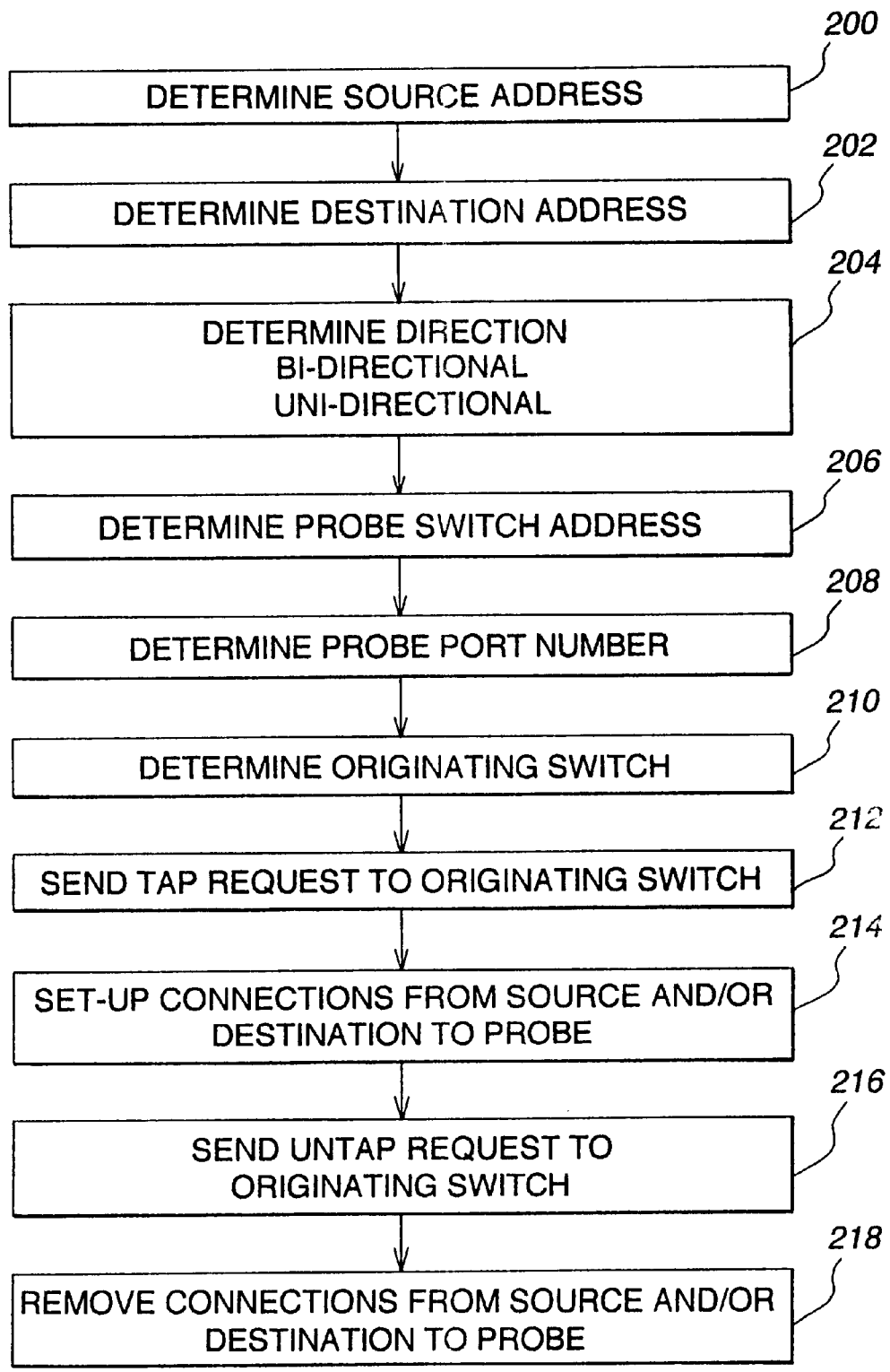
FIG. 2 is a flowchart of a method according to the present invention.

An overview of the method is presented as a flowchart in FIG. 2. In steps 200–210, a user determines the respective addresses of the source and destination nodes, the desired direction of the tap, the address of the switch to which the probe is connected, the port on the switch to which the probe is connected, and the originating switch which is along the connection between the source and destination nodes. Steps 200–208 can be performed in any order although it is clear that step 210, determining the originating switch, cannot be performed until the source and destination nodes are chosen. Further, it is also envisioned that the address of the probe switch and the port number to which the probe is connected may be pre-established such that a user need not concern herself with determining the address and port number of the probe switch.

In step 212, a tap request, including all of the required information, is sent to the identified originating switch. As above, this may be in the form of an SNMP message, although there are other protocols which one of ordinary skill in the art would be able to use to transmit this information to the originating switch. In step 214, the appropriate switch connections from the originating switch to the probe switch are then established by those switches in the network which are necessary to make the call-tapping path complete. This aspect of operation will be discussed in more detail below. When it is no longer necessary to monitor the data between the source and destination, the call-tapping path will be dismantled. Accordingly, in step 216, an un-tap request is sent to the originating switch which thereby causes the existing tap to be disconnected where, in step 218, the switches which are maintaining the connection to the probe are reconfigured. An untap request will identify a specific existing tap by the destination/source (DA/SA) pair since it is conceivable that multiple taps with differing DA/SA pairs may exist. The details of the operations included in steps 216 and 218 will be discussed in further detail below in regard to several examples.

Figure 3:
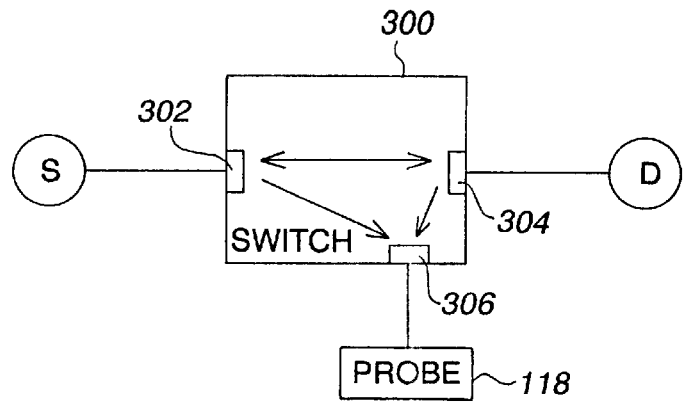
FIG. 3 is a schematic diagram of a first example of a switched network operating in accordance with the present invention.

In a first example, FIG. 3 shows a switch 300 having a port 302 and a port 304. A source node S is connected to port 302 and a destination node D is connected to port 304. As is known, the switch 300 will include an internal connection table 400 as shown in FIG. 4A. The connection table has at least five pieces of information in it: a destination address DA, a source address SA, an incoming port INPORT, an outgoing port OUTPORT, and a link list entry referred to as OUTPORTS. The entry OUTPORT is singular in that there is only one entry in that field, whereas the entry OUTPORTS is plural, since it can have more than one entry. As above, the designation of either "destination" or "source" relative to an address does not necessarily denote direction in which data is sent. Merely as a convention in the format of the connection table, the destination address DA is associated with the outgoing port OUTPORT and the source address SA is associated with the incoming port INPORT. In other words, in a given table entry, the port number identified as the incoming port INPORT is associated with the device whose address is entered in the source address SA column. Similarly, the device identified in the destination address DA column is associated with the port identified in the outgoing port OUTPORT column. Referring back to the network configuration shown in FIG. 3, the switch 300 will have a pair 402 of connection table entries which the switch 300 uses to pass data back and forth between the source and destination nodes S, D. In the first entry of the pair 402, data originating from the source S directed to the destination D is received on port 302 and transmitted out on port 304. Conversely, as shown in the second entry of the pair 402, data originating from the destination D directed to the source S is received on port 304 and transmitted out on port 302.

In a simple case of call-tapping, as shown in FIG. 3, the probe 118 is attached to the same switch 300 as are the source and destination. Specifically, the probe is connected to switch 300 at port 306. The tap request is sent by the user to switch 300 indicating the addresses of the source and destination nodes S, D, the address of the probe switch (in this case switch 300) and the port to which the probe is connected (in this case port 306). Concurrent with the receipt of the tap request, an entry in a tap table within switch 300 would be created. As shown in FIG. 4B, a tap table 410 includes entries indicating the destination/source address pair, DA/SA, a request port, RQPORT, which indicates the port on which the tap request was received, a response port, RSPPORT, which indicates the port on which a tap response was received, a switch type, TYPE, an indication of the status of the switch, STATUS, and an indication of the direction of the tap. As shown in FIG. 4B, an entry 412 is created in the tap table 410 of switch 300. It should be noted that the values in a tap table entry, especially RQPORT, RSPPORT, TYPE and STATUS are dynamic and any representation shown in the figures is merely a "snapshot" at one moment of time during operation in order to aid in explanation.

In the entry 412, for the DA/SA pair of S/D, the requesting port is, by convention, indicated as being "invalid" since switch 300 is the originating switch as shown in the TYPE entry. In this example switch 300 is the originating switch and therefore has received the tap request message as an SNMP message. Thus, there is no "port" on which the request message was received as would be the case if switch 300 were not the originating switch. This will become clearer in the following examples. In this case, however, the originating switch and the probe switch are the same so the response port is set to port 306 which is the port to which the probe 118 is connected. The status in the entry 412 is not shown as this can change depending upon the point in the process.

Once the entry 412 in the tap table 410 is complete, the entries in the connection table 400 for switch 300 must be changed so that data originating from the source S is directed to the port 306 and data originating from the destination D is also directed to the port 306 while maintaining the connection between the source and destination S, D. The original entry pair 402 would be rewritten as shown in entry pair 404. It should be understood that the connection table would not have entry pairs 402, 404 at the same time since there is only one entry pair per source/destination combination in a switch. The entry pairs 402, 404 are merely shown in one table for the sake of convenience and to ease explanation. Accordingly, in the first entry of the pair 404 for the connection from the destination D to the source S, the INPORT remains the same, i.e., port 302. As a record-keeping convention, however, the OUTPORT value is set to −1 and an entry is made in the OUTPORTS column indicating both of ports 304 and 306. When a −1 is encountered in the singular OUTPORT field for a given source/destination pair, the switches listed in the plural OUTPORTS column will be used. Accordingly, data directed from the source S to the destination D through switch 300 will be received on port 302 and transmitted out both port 304 to the destination D and port 306 to the probe 118. The other entry in the pair 404 indicates that, from the destination D to the source S, data will be received on port 304 and, the OUTPORT entry being set to −1 and the OUTPORTS entry to 302, 306, the data will be transmitted out port 302 to the source S and out port 306 to the probe 118. The example described above is, as can be seen, a bi-directional tap.

The foregoing example with regard to switch 300 was a bi-directional tap. If, however, a uni-directional tap were required, for example, such that only the data originating from the source S was directed to the probe 118, then the entry pair 406 would be submitted in place of entry pair 402. As can be seen in the first part of entry pair 406, data from the source S received on inport 302 is directed to the OUTPORTS 304 and 306 due to the −1 found in the OUTPORT column. The second part of the entry 406, however, shows that the data from the destination D received on port 304 is only directed to the source S at port 302. Accordingly, data originating from the destination D is not received by the probe 118. The entry pair 408, also shown in the connection table 400, represents the uni-directional tap when only data from the destination D is received by the probe 118.

Figure 5:
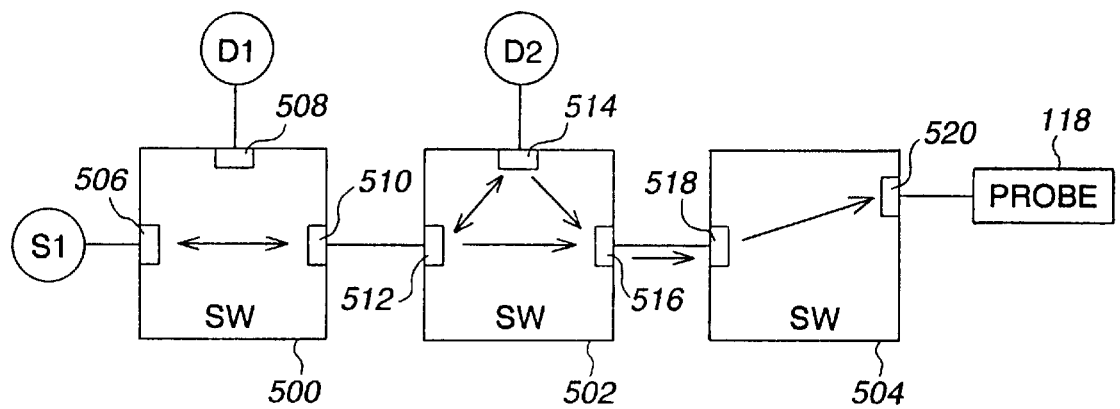
FIG. 5 is a schematic diagram of additional switched networks operating according to the present invention.

In a different configuration, referring to FIG. 5, a user desires to tap data being sent between a source S1 and a destination D1. A switch 500 connects the source S1 and destination D1 to one another through ports 506, 508, respectively. In the example shown, however, the user has attached the probe 118 to a switch 504 at a port 520. The switch 504 is not on the connection path between the source S1 and destination D1. Other switches in the network, e.g., switches 502 and 504, therefore, must be used to establish this tap connection. As is known, switch 500 includes a connection table 600 with a pair of entries 602 which establish the connection between the source S1 and the destination D1 through the ports 506, 508, similar to the discussion above and as shown in FIG. 6A. The tap request is issued to switch 500 by the user and includes the designation of the source S1 and the destination D1, the probe switch 504 and the probe port 520. For the sake of consistency, all tap requests in this specification are assumed to be bi-directional since a uni-directional tap is an easily implemented modification of the bi-directional tap.

According to the present invention, when switch 500 receives the tap request and determines that it is not the probe switch, it creates an entry 608 in a tap table 606 as shown in FIG. 6B. At this initial stage of the process, the requesting port will be indicated as invalid since this is the originating switch, indicated by the TYPE entry, and status will change depending upon the stage of tap processing reached. Initially, it will have a status of "unknown." The originating switch 500 will then send the tap request out all of its flood ports so as to reach all of the other switches in the topology in order to locate the probe switch.

Each switch contains an indication of those ports out which a message can be sent such that it reaches all other switches in the network. This is known as the flood path and is determined by a spanning-tree algorithm which is known in the art. Further, if the flood path is properly implemented, then each switch only receives one "flood" message from one other switch. In the example shown in FIG. 5, switch 500 only has one flood port 510 and switch 502 receives the tap request on its port 512. Switch 502 then creates an entry 612 in its tap table 610, as shown in FIG. 6C, indicating the source/destination pair S1/D1, and the port 512 on which the tap request message was received. The switch 502 then compares its address to the probe switch address in the tap request message. Since switch 502 is not the probe switch, it forwards the tap request message along the flood path through its one or more flood ports. As shown in FIG. 5, switch 502 only has one flood port 516 which is used to reach the flood path. Port 512 of switch 502 may be a "flood port," however, a switch does not flood the tap request message out the port on which the tap request was received.

The switch 504 receives the tap request message from switch 502 on its port 518. Switch 504 includes a tap table 614, shown in FIG. 6D, and in response to the tap request message from switch 502, it creates an entry 616 indicating the source/destination pair S1/D1, and the requesting port 518 on which the tap request message was received. The switch 504 then compares its address to the address of the probe switch found in the tap request message. In this case, the addresses match since switch 504 is the probe switch. Switch 504 then modifies its entry 616 to reflect that the response port is the probe port 520 and that the switch 504 is a terminal switch since it is the switch into which the probe is plugged. The switch 504 then accesses its connection table 618, shown in FIG. 6E, and creates an entry pair 620 for the source/destination pair S1, D1 connecting port 518 to port 520. As a result, any data with the source/destination pair of S1, D1 which is received on port 518 will be directed to port 520 and hence to the probe 118.

After modifying the connection table 618, the switch 504 sends a tap response message, indicating that the probe switch has been found; the tap response message is sent out the port on which the tap request arrived, in this case, port 518. The upstream switch 502 receives the tap response message indicating that the probe switch has been found and it updates its tap table entry 612 to show that the response port is port 516, i.e., the port of switch 502 on which the response message arrived. Switch 502 then modifies its connection table 622, FIG. 6F, to include an entry pair 624 for the pair S1, D1 with an INPORT 512 and an OUTPORT 516 where the INPORT is set to be the port on which the tap request message arrived and the OUTPORT is set to be the port on which the tap response message arrived. Thus, when data passing between the source S1 and the destination D1 arrive on port 512, the data is also directed to port 516. Switch 502 then passes the tap response message, indicating that the probe switch has been found, out through port 512, again, the port on which it received the tap request message.

The originating switch 500 receives the tap response message on port 510. Accordingly, it modifies the response port entry in entry 608 in tap table 606 (FIG. 6B), and then replaces the entry pair 602 in the connection table 600 (FIG. 6A) with the new entry pair 604 indicating the OUTPORT as −1 and the OUTPORTS as ports 508 and 510. As a result, within switch 500, data from the source S1 received on port 506 will go to the destination D1 at port 508 and to port 510, and likewise data from the destination D1 to the source S1 will go from port 508 to port 506 and to port 510. Thus, by sending the tap request message out through the flood path from the originating switch 500 and to all the other switches in the network, and then by the probe switch sending back a tap response message indicating that the probe switch has been found, those switches between the originating switch and the probe switch are identified, their ports configured and the tap executed.

In a different example, but also referring to FIG. 5, a user desires to tap the data between the source S1 and a destination D2, where S1 and D2 are attached to different switches. The probe 118 is still connected to port 520 of switch 504. As a tap request must be issued on a switch along the connection path between the source S1 and destination D2, it could be issued on either switch 500 or switch 502. In this particular example, the tap request is directed to switch 502. Referring to FIG. 7A, the connection table 600 for switch 500 would already contain an entry pair 626 for source destination pair S1, D2 indicating that ports 506 and 510 connect for data destined between the source S1 and the destination D2. In addition, switch 502 would have an entry pair 628 in its connection table 622 for the pair S1, D2 connecting ports 512 and 514, as shown in FIG. 7C.

The originating switch 502 would receive the tap request message from the user indicating the source S1, destination D2, probe switch 504 and port 520. A tap table 610 for switch 502, as shown in FIG. 7D, would then have an entry 632 written into it. Since switch 502 is the originating switch, it will be assigned that TYPE in the table. The switch 502 would then compare its address to the address of the probe switch indicated in the tap request message. Since switch 502 is not the probe switch, the originating switch 502 would send the tap request message out its known flood ports. As shown in FIG. 5, these would be ports 512 and 516.

Switch 500 receives the tap request message on port 510 and in its tap table 606 it creates an entry 634 indicating that the tap request came in on request port 510, as shown in FIG. 7B. Switch 500 compares its address to the address of the probe switch found in the tap request message and sees that it is not the probe switch. Accordingly, it then attempts to send the tap request message out the flood path. However, in the example shown in FIG. 5, the switch 500 is at a terminal end of the flood path. The switch 500 knows it is at a terminal end of the flood path since the only port on which it would "flood" out the tap request message is the port 510 on which it received the tap request message. Switch 500 then returns the tap response message of probe_not_found through the request port 510 to the switch 502 and deletes tap table entry 634. The manner in which switch 502 deals with the probe_not_found tap response message will be discussed in further detail below.

Switch 504 receives the tap request message on its port 518. It then modifies tap table 614 with a new entry 636 for the destination/source S1/D2 indicating the request port 518 as shown in FIG. 7F. Switch 504 then compares its address to the address of the probe switch in the tap request message. In this case there is a match and the entry 636 is updated to show the response port 520 to which the probe 118 is connected. The switch 504 updates the connection table 618, shown in FIG. 7E, with entry 638 and returns the tap response message of probe_found through the request port 518 and this tap response message is received by switch 502 on its port 516.

Switch 502 then updates its tap entry 632 to reflect the response port 516. It then modifies its connection table 622 by replacing the entry pair 628 with a new pair 630, setting the OUTPORT value to −1 for the first entry of the pair from the source S1 to the destination D2 to have an INPORT of 512 and OUTPORTS 514, 516. Similarly, for the direction from the destination D2 to the source S1 received on port 514, the OUTPORT value is set to −1 and OUTPORTS 512 and 516 are used as shown in FIG. 7C. As a result, the data originating from the source S1 goes through port 506 to port 510 to port 512 to port 514 to the destination D2 and from port 512 to port 516 to port 518, to port 520 and to the probe 118. Data originating from the destination D2 goes from port 514 to port 512 to port 510 to port 506 and to the source S and from port 514 to port 516 to port 518 to port 520 and to the probe 118.

Figure 8:
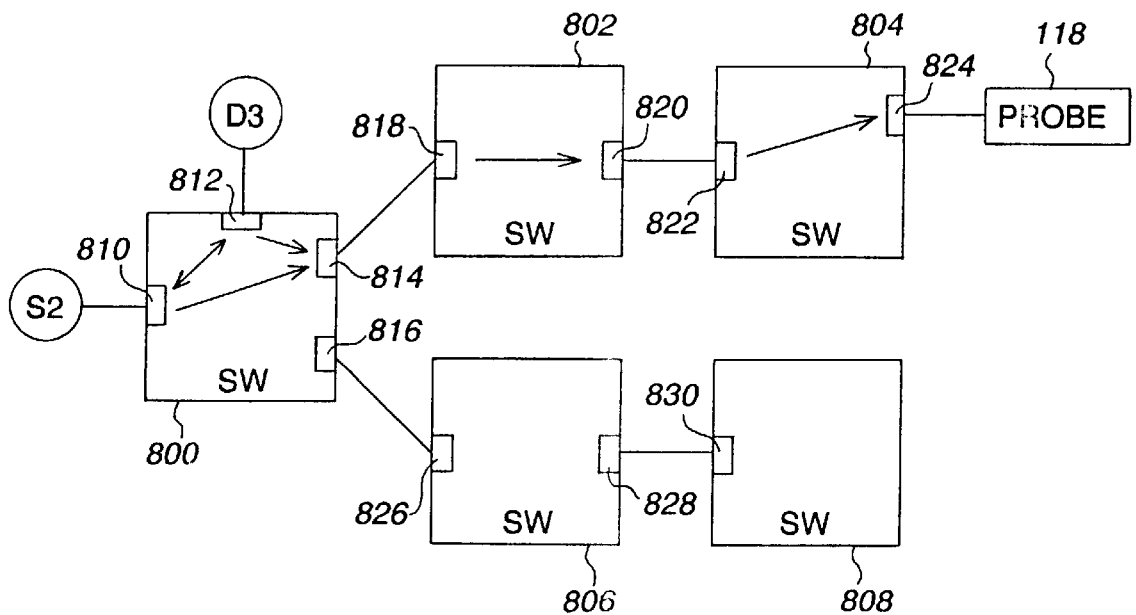
FIG. 8 is a schematic diagram of another example of a switched network operating according to the present invention.

A more complex scenario is discussed with regard to FIG. 8. This example represents a user needing to tap the data between a source S2 and a destination D3, both attached to switch 800, at a probe switch 804 having the probe 118 connected to port 824. As shown in FIG. 9A, the switch 800 includes a connection table 900 having an entry pair 902 for the source/destination pair S2, D3 involving ports 810, 812. The tap request message is directed to switch 800 since it is the only switch in the path between the source S2 and the destination D3. The switch 800 would receive the tap request message and in a tap table 904 create a tap entry 906 for the destination/source pair S2/D3 with the request port indication set to "invalid" since this is the originating switch, as shown in FIG. 9B. The response port, however, will not be indicated until a tap response message is received. Since switch 800 is not the probe switch, it sends the tap request message out all of its flood ports which, in this case are ports 814, 816.

Switch 806 receives the tap request message and modifies its tap table 908, FIG. 9G, to include a tap table entry 910 for the source/destination pair S2/D3 indicating a request port 826. Switch 806 compares its address to the probe switch address and, since they are not equal in this case, it then sends the tap request message out its known flood ports, in this case port 828.

Switch 808 receives the tap request message from switch 806 and modifies its tap table 912 to include tap table entry 914 as shown in FIG. 9H. The tap table entry 914 shows the request port as port 830, i.e., the port on which the tap request message arrived. Switch 808 compares its address to the probe switch address and determines that they do not match. Switch 808 then identifies its flood ports and attempts to flood out the tap request message. In this instance, however, the only flood port on switch 808 is the port 830 which is the port on which the tap request arrived. When any given switch floods out the tap request message, it sends it out on all flood ports other than the port on which the tap request message arrived. Switch 808, therefore, determines that it is at a terminal end of the flood path and deletes its entry 914 in the tap table 912. Switch 808 then returns the tap response message of probe_not_found through port 830.

Switch 806 receives the tap response message indicating probe_not_found, deletes its tap entry 910, and then passes the tap response message indicating probe_not_found out through port 826, i.e., the request port on which the tap request message arrived. Switch 800 receives the tap response message of probe_not_found on its port 816.

On the other leg of the flood path from switch 800, switch 802 receives the tap request message and modifies its tap table 916 with an entry 918 for the source/destination pair S2/D3 indicating a request port 818 as shown in FIG. 9D. Switch 802 compares its address to the probe switch address in the tap request message and when there is no match, sends the tap request message out its flood ports which, in this case, is only port 820.

Switch 804 receives the tap request message from switch 802, modifies its tap table 920 to include a tap table entry 922 for the source/destination pair S2/D3 showing a request port of 822, as seen in FIG. 9F. Switch 804 compares its address to the address of the probe switch and finds a match. Accordingly, switch 804 modifies its tap table entry 922 to reflect a response port 824 which is the port to which the probe 118 is connected. Switch 804 then modifies its connection table 924 to include an entry pair 926 for the source/destination pair S2, D3 with an INPORT 822 and an OUTPORT 824. Switch 804 then returns the tap response message of probe_found to switch 802 which modifies its tap table entry 918 to show a response port of 820 with a status of probe_found. Switch 802 then modifies its connection table 928, FIG. 9C, to include an entry pair 930 for the source/destination pair S2, D3 with an INPORT 818 and an OUTPORT 820 which are, respectively, the request port and the response port as found in the tap table entry 918. Switch 802 then returns the tap response message of probe_found on port 818 and this tap response message is received by switch 800 which modifies tap table entry 906 to reflect a response port 814 with a status of probe_found, as shown in FIG. 9B. Switch 800 then replaces connection table entry pair 902 with a new pair 903 where the first entry of the pair for the direction from the source S2 to the destination D3 has an INPORT of 810, an OUTPORT as −1 and OUTPORTS 812, 814. For the other half of the entry pair 928, from destination D3 to source S2, an INPORT of 812 is indicated with an OUTPORT of −1 and OUTPORTS 810, 814. Accordingly, a bi-directional tap, i.e., data from both the source S2 and destination D3, are directed to each other and also to the probe 118.

It should be noted that switch 800 received a probe_not_found response message from switch 806 and received a probe_found response message from switch 802. For any switch which is expecting tap response messages from more than one other switch, the only time the probe_not_found tap response message will be accepted is when all the other switches have been heard from and none of them indicates the probe has been found. With regard to the example with switch 800, the tap response message from switch 806 was ignored. This will be described further below in more detail.

As can be seen from the above examples with regard to FIGS. 3, 5 and 8, the ability to create the connection from the originating switch to the probe switch is present in each switch in the switch network. In other words, a centralized system does not configure the switches along a tap path in order to complete the connection. Effectively, such configuration capability is now distributed throughout the system and is present in each network switch. A network switch is, for example, provided with a central processing unit and associated memory for storing a program to configure the switch or hardware such as a custom ASIC along with a CPU and memory to implement the above-described functions.

Figure 10B:
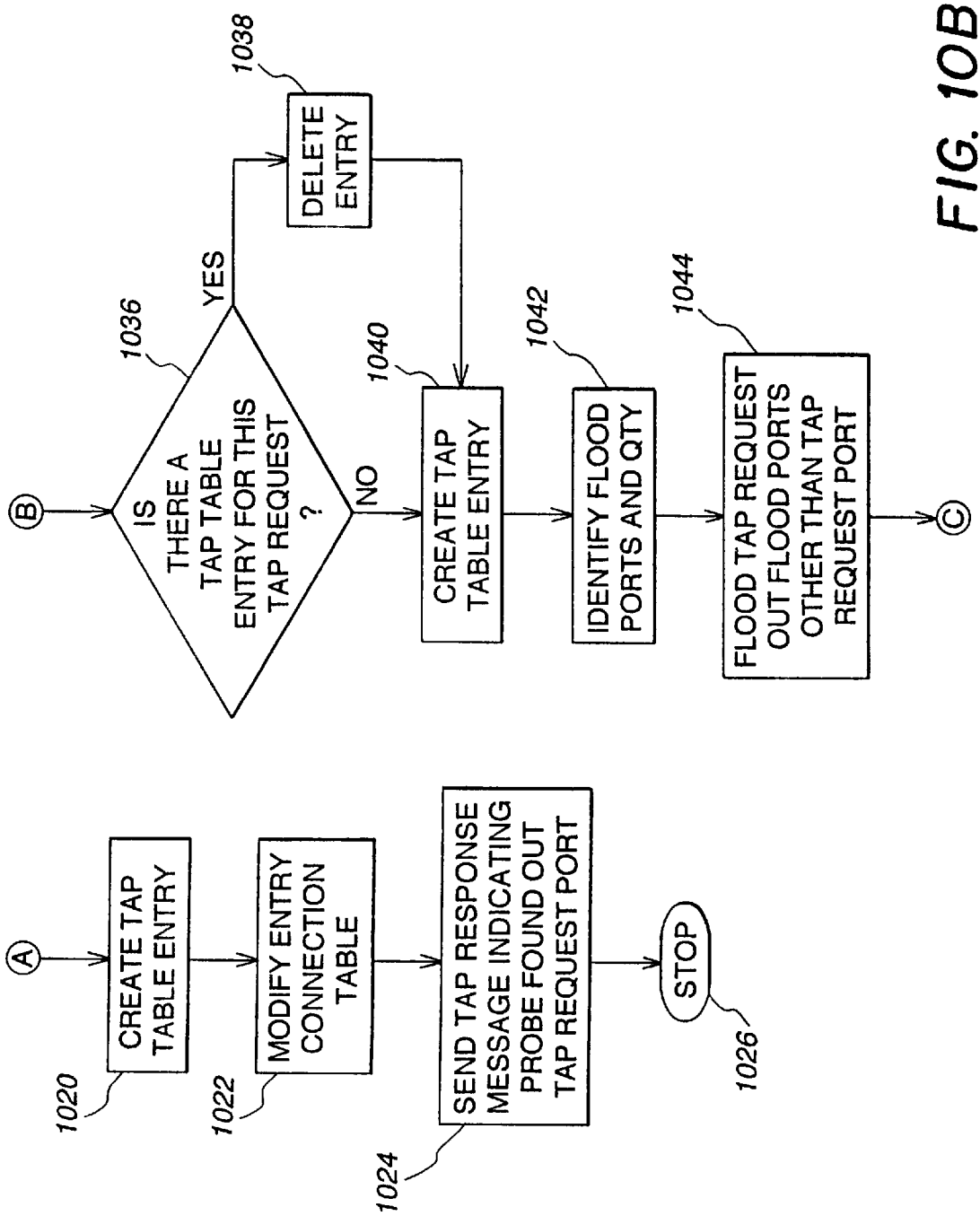
FIG. 10 is a flowchart of the tapping method in a switch according to the present invention.
Figure 10C:
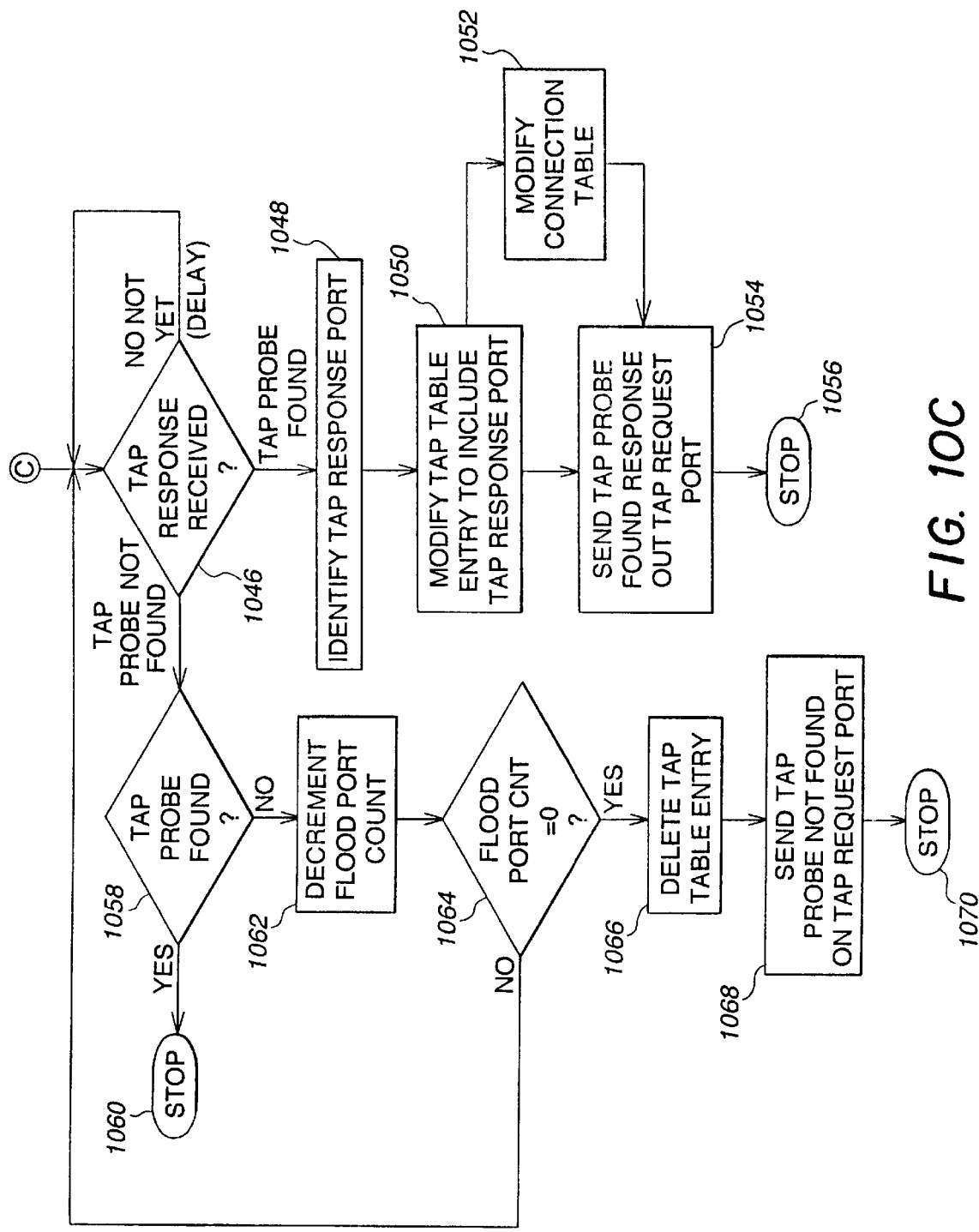

The process steps which any given switch with distributed capability executes will now be described with regard to the flowchart shown in FIG. 10. At step 1002, the tap request is received by the switch. In the case of an originating switch this could be an SNMP message. The steps as described in FIG. 10, however, apply to any type of switch whether it be an originating, intermediate or probe switch. At step 1004, the switch compares its address to the probe switch address found in the tap request message. When the switch address equals the probe switch address control passes to step 1006, where it is determined whether or not the switch is the originating switch. When the switch is identified as the originating switch, control passes to step 1008 where an appropriate entry is made in the tap table and next, in step 1010, the connection table is modified with an appropriate entry so that the tap is completed and operation stops at step 1012. Such modification of the connection tables may include setting OUTPORT to −1 and adding port designations to OUTPORTS as has been described above.

Returning to step 1006, when the switch is not the originating switch, control passes to step 1014 where the tap request port is identified as the port on which the tap request arrived. At step 1016, it is determined whether or not there is a tap table entry for this tap request as determined by the source/destination pair of the tap request message. When there is an entry in the tap table, control passes to step 1018 where the entry is deleted. After deletion of the entry in step 1018, or when there is no tap table entry for the tap request, as determined at step 1016, control passes to step 1020, where the tap table entry is created. It should be noted that the deletion of an already existing tap table entry in step 1018 is performed so as to remove any spurious tap table entries which may have been left over in the tap table and which are no longer valid. After step 1020, control passes to step 1022 where the entry in the connection table is modified so as to accomplish the call tap. At step 1024, a tap response message indicating probe_found is sent out the tap request port and at step 1026 the process comes to a stop.

Returning to step 1004, when the switch address does not equal the probe switch address, control passes to step 1028 where the tap request port is identified. At step 1030 it is determined whether or not the switch is at a terminal end of a flood path. When the switch is located at a terminal end of the flood path, control passes to step 1032 where the switch sends the tap response message out the tap request port indicating that the probe is not found and at step 1034 the operation stops.

When, at step 1030, it is determined that the switch is not at the terminal end of the flood path, control passes to step 1036 where it is determined whether or not there is a tap table entry for this tap request. When there is a tap table entry already, control passes to step 1038 where the tap table entry is deleted and then at step 1040 the tap table entry is created. This is done for the same reasons as explained above with regard to step 1018. If the request port is one of the identified flood ports, the request port is removed from the list of flood ports and the number of remaining flood ports is determined. The reason for counting the number of flood ports will be described later. At step 1042 the flood ports of the switch are identified. The identities of the flood ports for each switch are stored in the switch after having been determined by an appropriate spanning tree algorithm as is known in the art. Certainly, as the topology of the switch network changes, the set of flood ports for a particular switch may change as well.

At step 1044 the tap request message is flooded out all of the identified flood ports other than the identified tap request port on which the tap request message was received by the switch. Control then passes to step 1046 where the switch awaits receipt of a tap response message. When a tap response message is received and it is of the type indicating that the probe has been found, control passes to step 1048 where the tap response port is identified as the port on which the tap response message was received by the switch. Next, at step 1050, the tap table entry is modified to include the tap response port with control passing to step 1052 where the appropriate entry in the connection table is modified. Next, at step 1054 the switch sends the tap probe_found response message out the tap request port and finally, at step 1056, the process stops.

Returning to step 1046, when a tap response message is received indicating that the tap probe has not been found, control passes to step 1058 where the switch determines whether or not a tap response message has been received indicating that the tap probe has already been found. Step 1058 is implemented since a given switch may have flooded the tap request message out more than one flood port. If the spanning tree algorithm is implemented properly, the tap switch will only be found along one part of the flood path and a switch will only receive the probe_switch_found tap response message on only one port, although it may receive the tap response message that the probe switch was not found on the other ports. Accordingly, at step 1058, if a switch receives a tap response message indicating that the probe switch was not found when it has already received a message indicating that the probe switch was found, then control passes to step 1060 and the process stops whereby the switch effectively ignores the probe_not_found message since the probe switch has already been found. When, on the other hand, at step 1058 the switch has not been found, control passes to step 1062 where the flood port count is decremented by 1. At step 1064 it is determined whether or not the flood port count equals 0. This step is performed since the switch, if it has not received a message indicating that the probe switch has been found, waits to hear from all of its flood ports before determining that the probe switch was not found. When, at step 1064, the flood port count does not equal 0, control passes back to step 1046 to await further tap response messages. When the flood port count equals 0 at step 1064, control passes to step 1066 where the tap table entry for the source/destination pair is deleted from the tap table with step 1068 then sending a tap response message of probe_not_found out the tap request port and the process stops at step 1070.

When it is no longer necessary to tap or monitor data transmitted between any given source and destination node, then the probe can be disconnected in order to monitor other sources and destinations. So as not to create extraneous connections when switches are no longer needed to connect a source or a destination to a tap, there is also provided by the present invention a method to remove a tap and thus deconfigure switches which had been configured to provide the tap path. As each switch in the present invention has the capability to configure itself to provide the tap path, each switch also has the capability to deconfigure itself so as to remove itself from the no longer needed tap path.

Figure 11B:
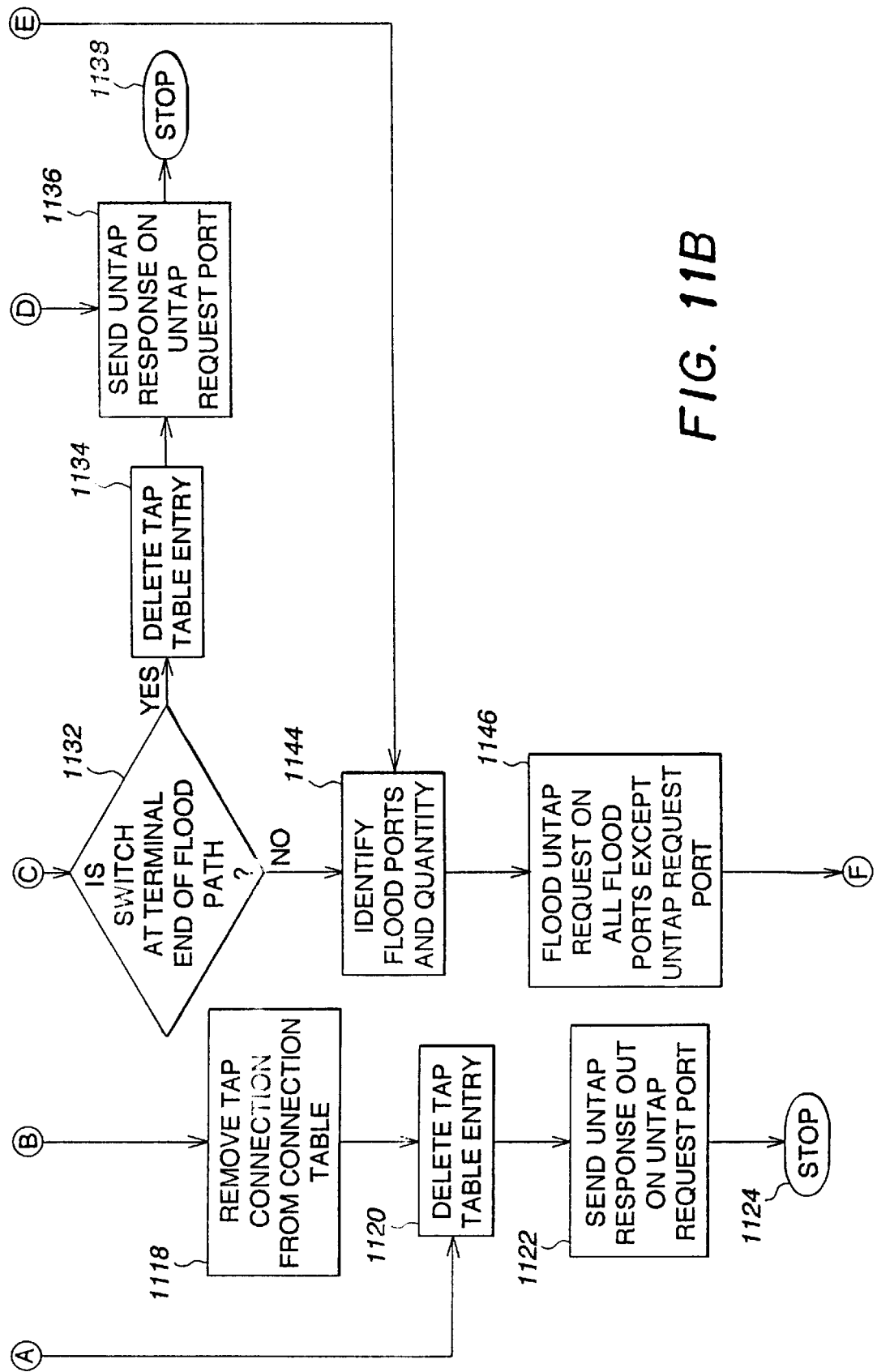
FIG. 11 is a flowchart of the untapping method in a switch according to the present invention.
Figure 11C:
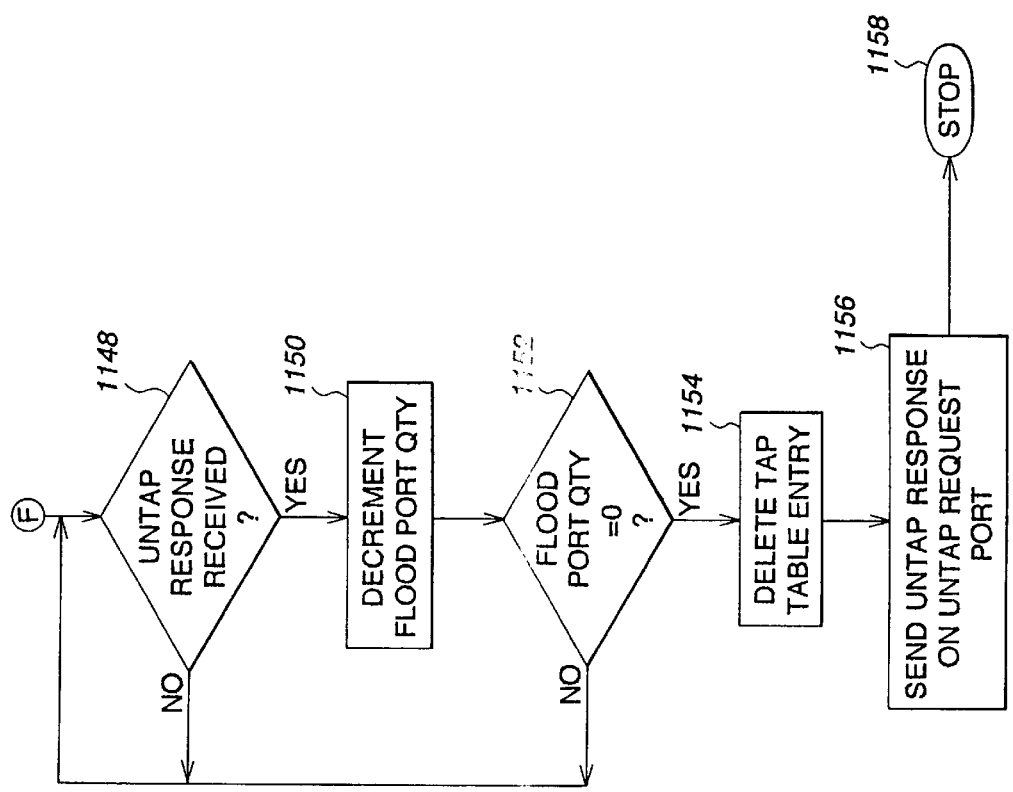

The process by which each switch removes a tap connection will be described in conjunction with the flowchart of FIG. 11. At step 1102, a switch receives an untap request which identifies the particular source and destination, the probe switch address, and the port on the probe switch to which the analyzer is connected. In the case of an originating switch, the untap request message is received, e.g., via an SNMP message, from a user. The steps described in FIG. 11, however, apply to any type of switch whether it be the originating switch, an intermediate switch, or the probe switch. The untap process, however, begins with an untap request being sent to the originating switch. At step 1104, it is determined if the switch address is equal to the probe switch address. When the two addresses are equal, control passes to step 1106 where it is determined if the switch is the originating switch. When it is determined that the switch is the originating switch, control passes to step 1108 where the appropriate entry in the connection table is modified so as to remove the connection to the probe. At step 1110, the entry in the tap table is deleted and at step 1112 the process stops.

Returning to step 1106, when the switch is not the originating switch, control passes to step 1114 where the untap request port is identified as the port on which the untap request arrived at the switch. At step 1116, it is determined whether or not the connection table needs to be modified. This step is performed since it may not be necessary to modify the connection table, since these connections may be needed to maintain the connection between the source and destination. An example of this would be switch 500 in the case of the tap between the source S1 and the destination D2 as described above with regard to FIG. 5. The connection table entry of switch 500 does not change since it is required to maintain the connection between S1 and D2. When the connection table needs to be modified, control passes to step 1118 where the appropriate entry in the connection table is modified so as to remove the tap connection. Otherwise, control goes to step 1120 where the tap table entry is deleted and at step 1122 the untap response is sent out on the untap request port with the process coming to a stop at step 1124.

The connection table is modified by removing the entries which direct data to the tap path. In the case where the originating switch and the tap switch are the same, such as switch 300 in FIG. 3, some connections must be maintained after the tap is removed. In such a case, the switch STATUS shown in tap table reentry pair 412 would be set to tap_disable_outport indicating that the switch must disable an outport. Accordingly, switch 300 will modify entry pair 404 by removing the RSPPORT port 306 from the OUTPORTS list and then place the remaining port in the OUTPORT column.

In another case, a particular switch may not change its connection table entry upon receipt of an untap request. Referring to switch 500 in the tap of S1/D2, its connection table entry pair 626 must be maintained to keep S1 and D2 connected to one another. In tap table entry 634, therefore, the STATUS would be tap_keep_outport indicating, for this DA/SA pair, the switch must keep its outport on an untap. Connection table 600 and its entry pair 626 would remain unchanged.

In the last case, switch 802 for example, its connection table entry pair 930 would be deleted upon an untap request since the connection is not needed to connect S2 and D3.

Returning to step 1104, when the switch address does not equal the probe address, control passes to step 1126 where the untap request port is identified. At step 1128, it is determined whether or not there is a tap table entry for this untap request and if there is one, control passes to step 1129 where it is determined if the connection table entry needs to be modified. If so, control passes to step 1130 where the tap connection is removed from the appropriate entry in the connection table. If not, control passes to step 1132. At step 1132, it is determined whether the switch is at a terminal end of the flood path and when at the terminal end of the flood path, control passes to step 1134, where the appropriate tap table entry is deleted and at step 1136 the untap response is sent out the untap request port with the operation coming to a stop at step 1138.

Returning to step 1128, when there is no tap table entry for this untap request, control passes to step 1140 where the switch determines whether or not it is at the terminal end of the flood path, and if at the terminal end of the flood path, control passes to step 1136 where the untap response is sent out on the untap request port and the process comes to a halt at step 1138.

If, at step 1140, the switch is not at the end of the flood path, control then passes to step 1142 where a tap table entry for this tap is created. It is noted that step 1142 is implemented so that the process is consistent since the untap request is flooded out to all switches, even those switches which may have no involvement in the existing tap configuration. By providing each switch with a tap table entry upon receipt of the untap request, when the switch receives back the untap response it can then delete the tap table entry and operation for all switches will be the same.

When at step 1132 the switch is determined not to be at the terminal end of the flood path or after step 1142, control passes to step 1144 where the flood ports, aside from the tap request port, and quantity thereof for the switch are identified. At step 1146, the untap request is flooded out all the flood ports except for the untap request port. At step 1148, the switch waits to receive untap responses. When an untap response has been received, control passes to step 1150 where the flood port quantity is decremented by 1. At step 1152, it is determined whether the flood port quantity is equal to 0 and if not, control passes back to step 1148 and if it is equal to 0, this indicates that the switch has received all of its untap responses from all of its flood ports and at step 1154 the tap table entry is then deleted. At step 1156, the untap response message is sent out on the untap request port and at step 1158 the process within the switch stops.

The following represent a Management Information Base (MIB) for the present invention. These parameters of an SNMP message are meant to be examples and do not limit the invention to these parameters only.

Call Tap MIB Parameters
TAP_VERB: required parameter
  TAP_VERB_CALL_TAP
  TAP_VERB_CALL_UNTAP
  TAP_VERB_OTHER
TAP_HEADER_TYPE:
  TAP_MAC_DA_SA—default
TAP_HEADER_LENGTH:
  defaults to 12
TAP_HEADER_VALUE: required parameter
TAP_HEADER_DIRECTION:
  TAP_BI_DIRECTIONAL—default
  TAP_UNI_DIRECTIONAL
TAP_SWITCH_MAC: required parameter
TAP_PORT: required parameter
The Tap Table MIB:
  All switches from the point where the tap was issued to the probe switch have tap table entries. This table is otherwise empty. The fields are defined as follows:
HeaderDASA: displays the DA/SA connection being tapped.
RQPort: the port which the tap request came in from (This is invalid for the originating switch)
RSPPort: the port the tap response came in from, or the probe port if the switch is the terminal switch.
Retries: number of retries used to repeat a request if no response received after predetermined time.
SwitchState:
  AwaitingTapResponses—switch is waiting for further tap responses
  ReceivingTapResponses—switch is receiving tap responses
  RetryingTapRequest—set when retry is being implemented
  TapActive—tap is active on this switch
  AwaitingUnTapResponses—switch is waiting for further untap responses
  ReceivingUnTapResponses—switch is receiving untap responses
  RetryingUnTapRequest—when retrying
  TapStateUnassigned—initial switch state
SwitchType:
  TapOriginatingSwitch—switch which originated the tap request
  TapIntermediateSwitch—any switch involved in the tap between the originating and the terminal switches
  TapTerminalSwitch—switch with the probe plugged in to it
  TapTypeUnassigned—initial switch type
SwitchStatus:
  TAP_DISABLE_OUTPORT—switch must disable an outport on an untap
  TAP_KEEP_OUTPORT—switch must keep its outports on an untap
  TAP_PROBE_NOT_FOUND—probe has not been found on this leg of the spanning tree
  TAP_OUTPORT_DECISION_UNKNOWN—place holder on tap request when still searching for probe switch
  TAP_STATUS_UNASSIGNED—initial switch status
Direction:
  TAP_BI_DIRECTIONAL—tap bi-directional
  TAP_UNI_DIRECTIONAL—tap uni-directional
The Stats Table MIB:
  This table contains a total count of messages received by the switch from all taps issued.
TapReqCnt: The number of tap requests the switch has received, either via SNMP or from adjacent switches.
TapRespCnt: The number of tap responses the switch has received from its neighboring switches.
UntapRespCnt: The number of untap responses the switch has received either via SNMP or from adjacent switches.
UntapRespCnt: The number of untap responses the switch has received from its neighboring switches.
ErrorCount: The error count will be incremented upon an occurrence of an error condition. These conditions include, but are not limited to, the following:
  (1) On a tap request, when a tap table entry for this request already exists;
  (2) On an untap request, when an attempt to untap a different direction than tapped is made; and
  (3) On a tap response, when no tap request entry in the table exists.

Certain other attributes of the present invention in different embodiments are meant to be included by this disclosure. For instance, a switch may be provided with capability to retry a tap or untap request. Specifically, if after a certain amount of time any switch in the topology that is waiting for a response, but has not received one, it may retry the tap or untap request again. This capability will allow for handling cases where a downstream switch may have hung up or become inoperable in some fashion.

In addition, the present invention can be implemented without knowing or preselecting the originating switch. In other words, the call-tap could be issued to any switch in the topology by directing the SNMP tap request message to any switch. A special message would then be sent out the flood tree to locate an originating switch for the tap. The originating switch would be defined as the switch with either the source or destination directly connected to it.

Figure 12:
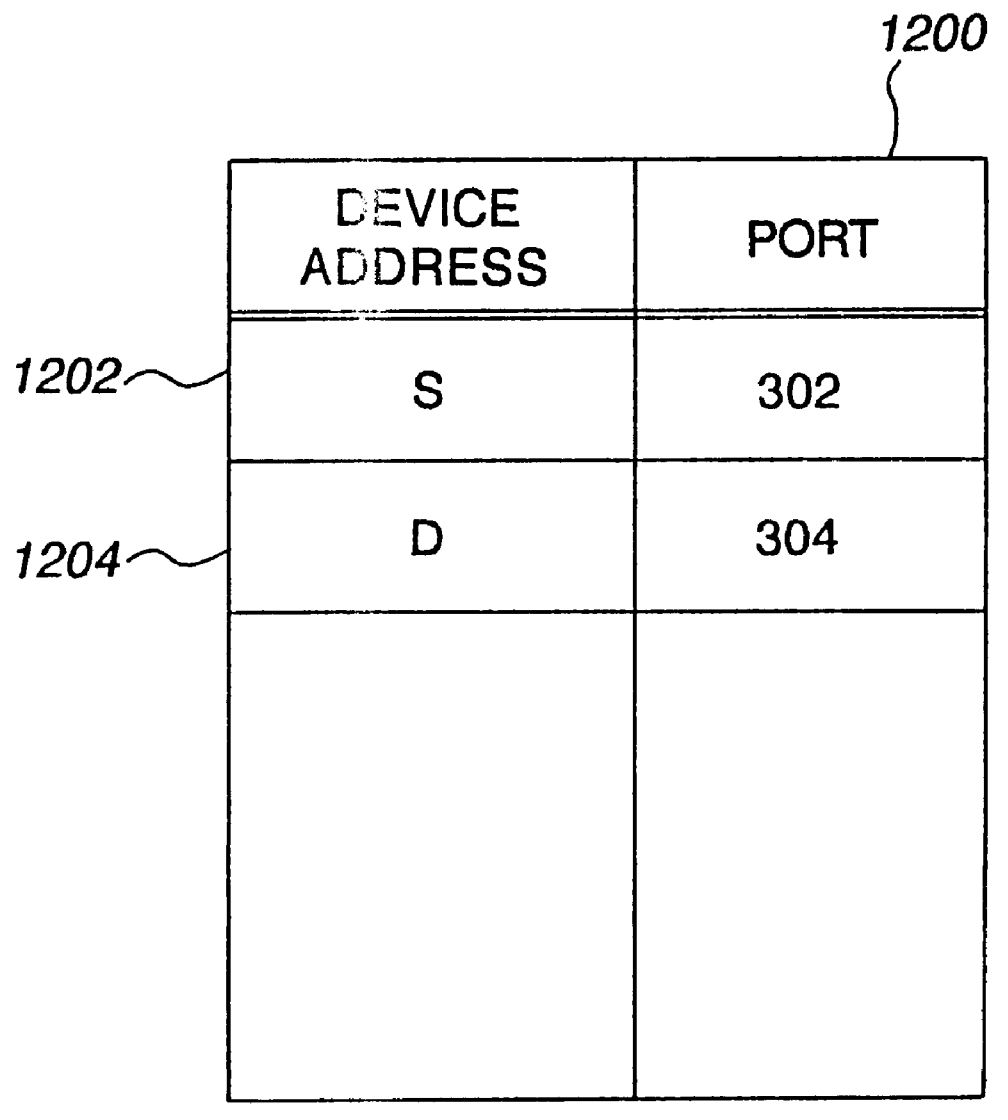

In any given network there will be at least one switch connected to at least the source or the destination. This switch can be determined by examining a local directory table in each switch. The local directory table for a given switch contains entries which relate an end-node, e.g., a user end station, to the port on the switch to which it is connected. For example, as shown in FIG. 12, local directory table 1200 for switch 300 shown in FIG. 3, would have two entries. Entry 1202 for device S connected to port 302 and entry 1204 for device D connected to port 304. The local directory table of each switch could then be queried and the switch with the desired source (or destination) would be defined as the originating switch. A specific message type could be defined to locate the switch with a given (source or destination) MAC address local to the switch. Once the originating switch is obtained, the connections to the probe switch would be established as has been described above.

In yet another modification, the probe switch can be determined by finding the switch connected to the probe. The probe, similar to any end-node, has a unique address, e.g., its MAC address. The local directory tables of all of the switches can be checked to find the switch which has the MAC address of the probe.

In still yet another modification, the connection tables of the switches can have only an OUTPORTS column without the need of a singular OUTPORT column. Connection would be made from the INPORT to those ports identified in the OUTPORTS column. There may be only one port identified in the OUTPORTS column or there may be more than one. This modification would also not require setting the OUTPORT column to −1 and would require less storage space in the switch.

What is claimed is:

1. A method of monitoring data transmitted between a source node and a destination node in a switched network, the network comprising a plurality of network switches with at least one network switch connected between the source and destination nodes through which the data between the source and destination nodes passes, each network switch including a connection table, the method comprising steps of:
   (a) identifying one network switch connected between the source and destination nodes to be an originating switch;
   (b) identifying one network switch to be a probe switch, the probe switch having a probe attached to a probe port;
   (c) identifying all intermediate network switches connected in a path between the originating switch and the probe switch; and
   (d) configuring the originating switch, the probe switch and all intermediate network switches to pass data transmitted from at least one of the source node and the destination node to the probe port of the probe switch.

2. The method as recited in claim 1, wherein the originating switch is a same switch as the probe switch.

3. The method as recited in claim 1, wherein step (c) comprises steps of:
   retrieving a connection table of the one network switch; and
   determining the one network switch to be the originating switch when there is an entry in the retrieved connection table for the source node and destination node pair.

4. The method as recited in claim 1, wherein step (c) comprises steps of:
   sending a tap request message out from the originating switch on a flood path, the flood path leading to all network switches in the network, the tap request message including an address of the probe switch and a port number identifying the probe port; and
   in each respective network switch in the flood path:
      receiving the tap request message;
      identifying a tap request port on which the tap request message was received;
      comparing the probe switch address to an address of the respective switch;
      when the respective switch address is not equal to the probe switch address,
   sending out the tap request message on the flood path from the respective switch; and
      when the respective switch address is equal to the probe switch address, sending a tap response message on the tap request port and establishing a connection between the probe port and the tap request port in the connection table of the respective switch.

5. The method as recited in claim 4, wherein the address of a switch is the Media Access Control (MAC), address of the switch.

6. The method as recited in claim 4, wherein step (d) comprises steps of:
   in each respective network switch in the path between the originating switch and the probe switch, other than the originating switch and the probe switch, when the tap response message is received, identifying a tap response port on which the tap response message was received, establishing a connection between the tap request port and the tap response port and sending the tap response out the tap request port; and
   in the originating switch, when the tap response is received, identifying the tap response port on which the tap response was received and establishing a connection between at least one of the source node and the destination node and the tap response port.

7. The method as recited in claim 6, wherein each step of establishing the connection between the tap request port and the tap response port in the respective network switch comprises steps of:
   creating an entry in the connection table of the respective network switch; and
   the created entry identifying the source node and destination node, the tap request port and the tap response port.

8. The method as recited in claim 4, wherein:
   when the respective network switch in the flood path receives the tap request message and the respective network switch address is not equal to the address of the probe switch and a tap request port on which the tap request message was received is the only port on which the flood path is accessed by the respective network switch, identifying the respective network switch as being at a terminal end of the flood path.

9. In a switched network including a plurality of switches and having a source node and a destination node sending data to one another through a first switch on a first path therebetween, a method of monitoring the data at a probe switch having a probe port and a data probe connected to the probe port, the method comprising steps of:
   (a) identifying all switches in a second path from the first switch to the probe switch; and
   (b) each switch on the second path configuring itself in response to a message received from an adjacent switch on the second path so as to pass data from at least one of the source node and the destination node to the data probe.

10. The method as recited in claim 9, further comprising a step of:
   (c) the first switch configuring itself so as to pass data from the destination node to the source node and to the data probe.

11. The method as recited in claim 9, further comprising a step of:
   the first switch sending a tap request message to switches identified on a flood path to which the first switch is connected, the tap request message including a first address of the source node, a second address of the destination node, a third address of the probe switch and a port number of the probe port.

12. The method as recited in claim 11, further comprising steps of:
   in each respective switch that receives the tap request message:
      identifying a tap request port on which the tap request message was received;
      comparing the third address to a respective switch address;
      when the third address is not equal to the respective switch address, sending the tap request message to all other switches identified on the flood path to which the respective switch is connected except that switch connected to the tap request port; and
      when the third address is equal to the respective switch address, creating an entry in a connection table of the respective switch so that the data received from at least one of the source node and the destination node on the tap request port is directed to the data probe, and sending a probe switch found message out on the tap request port.

13. The method as recited in claim 12, further comprising steps of:
   in each respective switch that receives the probe switch found message:
      identifying a probe-found port on which the probe switch found message was received;
      creating an entry in a connection table of the respective switch so that data received from at least one of the source node and the destination node is directed to the probe-found port; and
      when the respective switch is not the first switch, sending the probe switch found message out on the tap request port.

14. A method of establishing a tap connection between at least one of a source node and a destination node in a switched network, the method comprising steps of:
   sending a first message to an originating switch in a path between the source and destination nodes;
   the originating switch forwarding the first message so as to be received by all other switches in a flood-path within the switched network;
   in each respective switch which receives the first message, determining if the respective switch is a probe switch and when the respective switch is the probe switch, sending a second message out a first port on which the first message was received and establishing a connection between the first port and a probe port to which a probe is connected and when the respective switch is not the probe switch, sending the first message so as to be received by other switches in the flood-path; and
   in each respective switch which receives the first and second messages, establishing a connection between the first port and a second port on which the second message was received and sending the second message out the first port.

15. A self-configuring switch for establishing, in a switched network, a tap connection between at least one of: a source node and a destination node, and a probe switch, the self-configuring network switch comprising:
   means for receiving a tap request message identifying a particular tap request;
   means for identifying a tap request port on which the tap request message is received;
   means for comparing an address of the self-configuring network switch to a probe switch address in the tap request message;
   means for sending the tap request message out a flood path port, other than the tap request port, when the comparing means determines that the self-configuring network switch address is not equal to the probe switch address;
   means for sending a tap response message out on the tap request port when the comparing means determines that the self-configuring network switch address is equal to the probe switch address;
   means for establishing a connection between the tap request port and a probe port, to which a probe is attached, when the comparing means determines that the self-configuring network switch address is equal to the probe switch address;
   means for receiving a tap response message identifying the particular tap request;
   means for identifying a tap response port on which the tap response message is received;
   means for establishing a connection between the tap request port and the tap response port when both a tap request message and a tap response message have been received; and
   means for sending the tap response message out the tap request port when both a tap request message and tap response message have been received.

16. In a switched network including a plurality of switches, one switch of the plurality of switches being a probe switch having a probe port to which a probe is attached, the switched network having a source node and a destination node, a method of monitoring, at the probe switch, data sent between the source and destination nodes, the method comprising steps of:
   (a) identifying an originating switch in a first path between the source and destination nodes;
   (b) identifying all switches in a second path from the originating switch to the probe switch; and
   (c) each switch on the second path configuring itself, in response to a message received from an adjacent switch on the second path, so as to pass data from at least one of the source node and the destination node to the probe switch.

17. The method as recited in claim 16, wherein step (a) comprises steps of:
   in each respective switch in the plurality of switches:
      retrieving a local directory table of the respective switch;
      examining each entry in the local directory table; and
      when a local directory table entry is found for the source node, determining the respective switch to be the originating switch.

18. The method as recited in claim 16, wherein step (a) comprises steps of:

in each respective switch in the plurality of switches:
retrieving a local directory table of the respective switch;
examining each entry in the local directory table; and
when a local directory table entry is found for the destination node, determining the respective switch to be the originating switch.

19. The method as recited in claim 17, further comprising a step of:
the originating switch sending a tap request message to switches identified on a flood path to which the originating switch is connected, the tap request message including a first address of the source, a second address of the destination, a third address of the probe switch and a port number of the probe port.

20. The method as recited in claim 19, further comprising steps of:
in each respective switch that receives the tap request message:
identifying a tap request port on which the tap request message was received;
comparing the third address to a respective switch address;
when the third address is not equal to the respective switch address, sending the tap request message to all other switches identified on the flood path to which the respective switch is connected except that switch connected to the tap request port; and
when the third address is equal to the respective switch address, creating an entry in a connection table of the respective switch so that the data received from at least one of the source node and the destination node on the tap request port is directed to the data probe and sending a probe switch found message out on the tap request port.

21. The method as recited in claim 20, further comprising steps of:
in each switch that receives the probe switch found message:
identifying a probe-found port on which the probe switch found message was received;
creating an entry in a connection table of the respective switch so that data received from at least one of the source node and the destination node is directed to the probe-found port; and
when the respective switch is not the first switch, sending the probe switch found message out on the tap request port.

22. The method as recited in claim 18, further comprising a step of:
the originating switch sending a tap request message to switches identified on a flood path to which the originating switch is connected, the tap request message including a first address of the source, a second address of the destination, a third address of the probe switch and a port number of the probe port.

23. The method as recited in claim 22, further comprising steps of:
in each respective switch that receives the tap request message:
identifying a tap request port on which the tap request message was received;
comparing the third address to a respective switch address;
when the third address is not equal to the respective switch address, sending the tap request message to all other switches identified on the flood path to which the respective switch is connected except that switch connected to the tap request port; and
when the third address is equal to the respective switch address, creating an entry in a connection table of the respective switch so that the data received from at least one of the source node and the destination node on the tap request port is directed to the data probe and sending a probe switch found message out on the tap request port.

24. The method as recited in claim 23 further comprising steps of:
in each switch that receives the probe switch found message:
identifying a probe-found port on which the probe switch found message was received;
creating an entry in a connection table of the respective switch so that data received from at least one of the source node and the destination node is directed to the probe-found port; and
when the respective switch is not the first switch, sending the probe switch found message out on the tap request port.

25. A self-configuring switch for monitoring data sent between a first node and a second node in a switched network including said switch, the data being sent through a first switch on a first path between the first and second nodes within the switched network, the data being monitored at a third node, the switch comprising:
means for searching for all switches in a second path from the first switch to the third node; and
configuring means for configuring the switch in response to a message received from an adjacent switch in the second path so as to pass data from at least one of the first and second nodes to the third node.

* * * * *